(12) United States Patent
Kubota et al.

(10) Patent No.: US 9,146,379 B2
(45) Date of Patent: Sep. 29, 2015

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Ichiro Kurihara, Tochigi (JP); Tomohiro Yonezawa, Tochigi (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 0 days.

(21) Appl. No.: 14/327,592

(22) Filed: Jul. 10, 2014

(65) Prior Publication Data

US 2015/0029602 A1    Jan. 29, 2015

(30) Foreign Application Priority Data

Jul. 29, 2013 (JP) .................. 2013-156616

(51) Int. Cl.
*G02B 9/16* (2006.01)
*G02B 13/00* (2006.01)

(52) U.S. Cl.
CPC ................ *G02B 13/0035* (2013.01)

(58) Field of Classification Search
CPC ....... G02B 13/0035; G02B 13/18; G02B 9/16
USPC ........................................... 359/716
See application file for complete search history.

(56) References Cited

FOREIGN PATENT DOCUMENTS

| JP | 2010-145648 A | 7/2010 |
|---|---|---|
| JP | 2012-014139 A | 1/2012 |

*Primary Examiner* — Scott J Sugarman
(74) *Attorney, Agent, or Firm* — Kubotera & Associates, LLC

(57) ABSTRACT

An imaging lens includes a first lens having positive refractive power; a second lens having positive refractive power; and a third lens having negative refractive power, arranged in the order from an object side to an image plane side. The first lens and the third lens respectively have an object-side surface and an image plane-side surface whose curvature radii are both positive. The second lens has an image plane-side surface whose a curvature radius is negative. In addition, when the first lens has refractive power P1, the second lens has refractive power P2, the third lens has refractive power P3, the curvature radius of the image plane-side surface of the second lens is R2r, and the curvature radius of the object-side surface of the third lens is R3f, the imaging lens satisfies specific conditional expressions.

5 Claims, 15 Drawing Sheets

IMAGING LENS

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small-sized camera such as a camera for mounting in a portable device, which includes a cellular phone, a smartphone, and a portable information terminal, a digital still camera, a security camera, a vehicle onboard camera, and a network camera.

In these years, in place of cellular phones that are intended mainly for making phone calls, so-called "smartphones" have been more widely used, i.e., cellular phones with functions of portable information terminals (PDA) and/or personal computers. Since the smart phones generally are highly functional and exhibit high performance as opposed to the cellular phones, it is possible to directly edit images taken by a camera thereof without importing the images in personal computers or the like. In case of the smartphones, it is possible to use images taken by the cameras thereof in various applications. For example, the images may be used for creating characters of online games or makeup simulations. Such uses of the images, which were not conventionally common, are becoming increasingly popular every year with an increase in popularity of the smartphones.

Generally speaking, an imaging lens to be mounted in a portable device such as a cellular phone or a smartphone, which is developed for advanced users, is required to have optical performances that are equivalent to those of digital still cameras such as a high resolution and excellent color reproduction, as well as a small size due to limited space in a portable device. However, as the imaging lens to be mounted in a camera used for the above-described applications, it is not essential for the imaging lens for mounting in a camera to have the high resolution, but rather than that, it is more critical to have a wide angle of view, i.e., wide angle, in some applications.

An imaging lens having a three lens configuration can relatively satisfactorily correct aberrations and is also suitable for downsizing, so that such a lens has been widely used in the lens configuration of the imaging lens of the camera for mounting in the above-described portable devices. As the three lens configuration, there has been a well-known lens configuration, which includes a first lens having positive refractive power; a second lens having negative refractive power; and a third lens having positive or negative refractive power, arranged in this order from an object side. In the lens configuration, since the second lens has negative refractive power, it is relatively easy to achieve downsizing of the imaging lens. In addition, chromatic aberration generated in the first lens is suitably corrected through the second lens. Therefore, the lens configuration is one of effective lens configurations in view of downsizing of the imaging lens and satisfactory correction of aberrations.

However, in the lens configuration described above, since the second lens has negative refractive power, when it is attempted to attain both downsizing of the imaging lens and a wider angle, refractive power of each lens tends to be relatively strong. As a result, it is necessary to improve the fabrication accuracy and assembly accuracy of the lenses. For this reason, there has been recently proposed a lens configuration, in which refractive powers of all of the three lenses are positive. As the imaging lens having such three lens configuration, for example, an imaging lens described in Patent Reference 1 has been known.

According to the imaging lens disclosed in Patent Reference 1, the second lens and the third lens have inflexion points, and with aspheric surface shapes having the inflexion points, downsizing of the imaging lens and a wider angle are attained, while correcting aberrations.

In addition, although the lens configuration is slightly unfavorable in view of downsizing of the imaging lens and satisfactory correction of aberrations, as a lens that has a small F number and is bright, for example, there is known an imaging lens described in Patent Reference 2. Similar to the imaging lens disclosed in Patent Reference 1, in the imaging lens disclosed in Patent Reference 2, the first lens and the second lens have positive refractive powers. However, different from that in Patent Reference 1, the third lens has negative refractive power.

Patent Reference 1: Japanese Patent Application Publication No. 2012-014139

Patent Reference 2: Japanese Patent Application Publication No. 2010-145648

According to the imaging lens described in Patent Reference 1, it is possible to attain downsizing of the imaging lens while correcting aberrations to some extent. However, with increasing diversification in uses of images taken by cameras each year, imaging lenses are demanded to have even wider angles as one of added values of the imaging lens. Although the imaging lens described in Patent Reference 1 has the wider angle of view than that of conventional one, there is a limit by itself for attaining even wider angle.

Further, in case of the imaging lens described in Patent Reference 2, the whole lens system has a long focal length, and an axial length of the imaging lens is also long. Accordingly, it is difficult to achieve both wider angle and downsizing of the imaging lens.

Here, difficulty of attaining both downsizing and the wider angle while correcting aberrations satisfactorily is not a problem specific to the imaging lens to be mounted in portable devices such as the cellular phones and the smartphones. Rather, it is a common problem also for an imaging lens to be mounted in a relatively small camera such as digital still cameras, security cameras, vehicle onboard cameras, and network cameras.

In view of the above-described problems in conventional techniques, an object of the present invention is to provide an imaging lens that can attain both downsizing and a wider angle, while satisfactorily correcting aberrations.

Further objects and advantages of the invention will be apparent from the following description of the invention.

SUMMARY OF THE INVENTION

In order to attain the objects described above, according to a first aspect of the present invention, an imaging lens includes a first lens having positive refractive power; a second lens having positive refractive power; and a third lens having negative refractive power, arranged in the order from an object side to an image plane side. The first lens and the third lens respectively have an object-side surface and an image plane-side surface whose curvature radii are both positive. The second lens has an image plane-side surface whose curvature radius is negative. In addition, when the first lens has refractive power P1, the second lens has refractive power P2, the third lens has refractive power P3, the curvature radius of the image plane-side surface of the second lens is R2r, and the curvature radius of the object-side surface of the third lens is R3f, the imaging lens according to the first aspect of the invention satisfies the following conditional expressions (1) and (2):

$$35<(P1+P2)/|P3|<55 \qquad (1)$$

$$-8<R2r/R3f<-3 \qquad (2)$$

As described above, according to the imaging lens having the three-lens configuration, in which the second lens has negative refractive power, in an attempt to attain both downsizing of the imaging lens and the wide angle, each lens tends to have relatively strong refractive power. Consequently, it is necessary to enhance fabrication accuracy and assembly accuracy of the lens. According to the first aspect of the present invention, since two of the three lenses, which are disposed on the object side, have positive refractive powers, it is possible to have positive refractive power by the two lenses and thereby it is achievable to have refractive power of each lens relatively weak. As such, it is possible to satisfactorily achieve both downsizing and wider angle. Moreover, since refractive power of each lens that composes the imaging lens is relatively weak, he surface shape of each lens can be gentle, and it is achievable to improve workability and assemblability of the imaging lens.

When it is attempted to achieve a wider angle of the imaging lens, it is necessary to shorten a focal length of the imaging lens than that of a conventional imaging lens, when the size of an image plane of an imaging element is the same. As the focal length is shortened, the total length of the imaging lens is short relative to the size of the image plane of the imaging element, so that it is difficult to restrain incident angles of light beams emitted from the imaging lens to the imaging element within the range of incident angles of light beams that can be taken in the imaging element, i.e., within the range of so-called "chief ray angle (CRA)".

The conditional expression (1) shows the ratio of the refractive powers of the first lens and the second lens relative to that of the third lens, and when the imaging lens satisfies the conditional expression (1), it is achievable to obtain a wide angle while restraining the incident angle of a light beam emitted from the imaging lens to an imaging element within the range of the chief ray angle. In addition, when the imaging lens satisfies the conditional expression (1), it is also achievable to satisfactorily correct an astigmatism and a distortion while attaining downsizing of the imaging lens. When the value exceeds the upper limit of "55", although it is easy to restrain the incident angle of a light beam emitted from the imaging lens to the imaging element within the range of the chief ray angle, it is difficult to achieve downsizing of the imaging lens. Furthermore, since astigmatic difference increases on the periphery of the image, it is difficult to obtain satisfactory image-forming performance. On the other hand, when the value is below the lower limit of "35", although it is advantageous for downsizing of the imaging lens, the distortion increases and it is difficult to obtain satisfactory image-forming performance.

Here, according to the invention, the shape of a lens is specified with a symbol of a curvature radius, but whether the curvature radius is positive or negative is determined according to a general definition, i.e., with a traveling direction of a light beam is set as positive, when a center of a curvature of a lens surface is on the image plane side, the curvature radius is positive, and when the center is on the object side, the curvature radius is negative. In addition, in this specification, for convenience, the imaging lens is considered to be disposed in air.

When the imaging lens satisfies the conditional expression (2), it is achievable to restrain the field curvature within a satisfactory range, while achieving downsizing of the imaging lens. In addition, when the imaging lens satisfies the conditional expression (2), it is also achievable to restrain an incident angle of a light beam emitted from the imaging lens to the imaging element within the range of the chief ray angle. When the value exceeds the upper limit of "−3", although it is easy to restrain the incident angle of a light beam emitted from the imaging lens to the imaging element within the range of the chief ray angle, an exit pupil moves to the object side and thereby the back focal length is longer, so that it is difficult to achieve downsizing of the imaging lens. Moreover, since the image-forming surface curves to the image plane side, it is difficult to obtain satisfactory image-forming performance. On the other hand, when the value is below the lower limit of "−8", although it is favorable for downsizing of the imaging lens, it is difficult to restrain the incident angle of a light beam emitted from the imaging lens to the imaging element within the range of the chief ray angle, so that a phenomenon of dark image on the periphery relative to the image at the center, i.e., so-called "shading phenomenon", easily occurs. Moreover, since the image-forming surface curves to the object side, also in this case, it is difficult to obtain satisfactory image-forming performance.

According to a second aspect of the invention, when a distance on an optical axis between the image plane-side surface of the first lens and the object-side surface of the second lens is D12 and a distance on the optical axis between the image plane-side surface of the second lens and the object-side surface of the third lens is D23, the imaging lens having the above-described configuration preferably satisfies the following conditional expression (3):

$$0.5<D12/D23<1.0 \qquad (3)$$

When the imaging lens satisfies the conditional expression (3), it is achievable to restrain a field curvature, an astigmatism, and a distortion within satisfactory ranges in a well-balanced manner, while restraining the incident angle of a light beam emitted from the imaging lens to the imaging element within the range of the chief ray angle. When the value exceeds the upper limit of "1.0", although it is easy to restrain the incident angle of a light beam emitted from the imaging lens to the imaging element within the range of the chief ray angle, the astigmatic difference increases, so that it is difficult to obtain satisfactory image-forming performance. On the other hand, when the value is below the lower limit of "0.5", the distortion increases and the image-forming surface curves to the object side, so that it is difficult to obtain satisfactory image-forming performance. Moreover, it is also difficult to restrain the incident angle of a light beam emitted from the imaging lens to the imaging element within the range of the chief ray angle, and shading easily occurs.

According to a third aspect of the invention, when the first lens has a focal length f1 and the third lens has a focal length f3, the imaging lens having the above-described configuration preferably satisfies the following conditional expression (4):

$$-0.1<f1/f3<-0.01 \qquad (4)$$

When the imaging lens satisfies the conditional expression (4), it is achievable to restrain a field curvature, an astigmatism, and distortion within satisfactory ranges in a well-balanced manner, while achieving downsizing of the imaging lens. When the value exceeds the upper limit of "−0.01", the first lens has relatively strong refractive power in comparison with the third lens, although it is advantageous for downsizing of the imaging lens, the image-forming surface curves to the object side and the astigmatic difference increases, so that it is difficult to obtain satisfactory image-forming performance. On the other hand, when the value is below the lower limit of "−0.1", the first lens has weak refractive power relative to the third lens. In this case, although it is easy to correct distortion, a position of the exit pupil moves to the object side and the back focal length is long, so that it is difficult to achieve downsizing of the imaging lens.

According to a fourth aspect of the present invention, when the second lens has a focal length f2 and the third lens has a focal length f3, the imaging lens having the above-described configuration preferably satisfies the following conditional expression (5):

$$-0.35 < f2/f3 < -0.05 \quad (5)$$

When the imaging lens satisfies the conditional expression (5), it is achievable to satisfactorily correct aberrations such as the field curvature, astigmatism, and distortion. When the value exceeds the upper limit of "−0.05", the third lens has weak refractive power relative to the second lens, so that it is difficult to achieve downsizing of the imaging lens. In addition, since the distortion increases and the astigmatic difference increases, it is difficult to obtain satisfactory image-forming performance. On the other hand, when the value is below the lower limit of "−0.35", the third lens has strong refractive power relative to the second lens, so that, although it is advantageous for downsizing of the imaging lens, the image-forming surface curves to the object side, and it is difficult to obtain satisfactory image-forming performance. Moreover, it is difficult to restrain the incident angle of a light beam emitted from the imaging lens to the imaging element within the range of the chief ray angle.

According to a fifth aspect of the invention, when the first lens has an Abbe's number vd1, the second lens has an Abbe's number vd2, and the third lens has an Abbe's number vd3, the imaging lens having the above-described configuration preferably satisfies the following conditional expressions (6) to (8):

$$45 < vd1 < 75 \quad (6)$$

$$45 < vd2 < 75 \quad (7)$$

$$45 < vd3 < 75 \quad (8)$$

When the imaging lens satisfies the conditional expressions (6) to (8), the Abbe's number of each lens that composes the imaging lens is large, so that it is possible to restrain generation of chromatic aberrations generated upon passing through each lens, and thereby it is achievable to suitably restrain the chromatic aberration of the imaging lens.

DETAILED DESCRIPTION OF PREFERRED EMBODIMENTS

Hereunder, referring to the accompanying drawings, an embodiment of the present invention will be fully described.

FIGS. 1, 4, 7, 10, and 13 are schematic sectional views of imaging lenses in Numerical Data Examples 1 to 5 according to the embodiment, respectively. Since a basic lens configuration is the same among those Numerical Data Examples, the lens configuration of the embodiment will be described with reference to the illustrative sectional view of Numerical Data Example 1.

Figure 1:
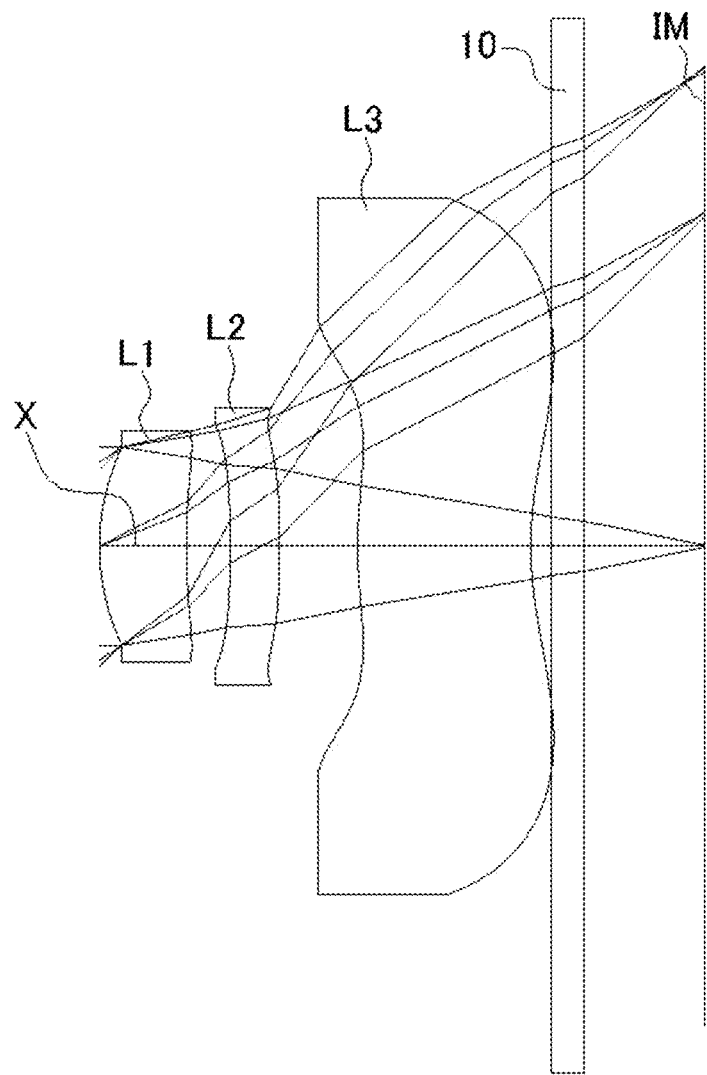
FIG. 1 shows a sectional view of a schematic configuration of an imaging lens in Numerical Data Example 1 according to an embodiment of the invention.

As shown in FIG. 1, the imaging lens of the embodiment includes a first lens L1 having positive refractive power, a second lens L2 having positive refractive power, and a third lens L3 having negative refractive power, arranged in the order from an object side to an image plane side. A filter 10 may be provided between the third lens L3 and an image plane IM of an imaging element. The filter 10 may be optionally omitted. In the imaging lens of the embodiment, there is provided an aperture stop on an object-side surface of the first lens L1.

The first lens L1 is formed in a shape such that a curvature radius r1 of an object-side surface thereof and a curvature radius r2 of an image plane-side surface thereof are both positive, and has a shape of a meniscus lens directing a convex surface thereof to the object side near an optical axis X.

The second lens L2 is formed in a shape such that a curvature radius r3 of an object-side surface thereof and a curvature radius r4 of an image plane-side surface thereof are both negative, and has a shape of a meniscus lens directing a concave surface thereof to the object side near the optical axis X. Here, the shape of the second lens L2 is not limited to the one in this embodiment. The shape of the second lens L2 can be any as long as the curvature radius r4 of the image plane-side surface thereof is negative. Numerical Data Examples 1 and 2 are examples, in which the second lens L2 has a shape of a meniscus lens directing a concave surface thereof to the object side near the optical axis X, and Numerical Data Examples 3-5 are examples, in which the second lens L2 is formed in a shape such that the curvature radius r3 of the object-side surface thereof is positive, i.e. a shape of a biconvex lens near the optical axis X.

The third lens L3 is formed in a shape such that a curvature radius r5 of an object-side surface thereof and a curvature radius r6 of an image plane-side surface thereof are both positive, and has a shape of a meniscus lens directing a convex surface thereof to the object side near the optical axis X. The third lens L3 has aspheric shapes, and has an inflexion point respectively on the object-side surface thereof and the image plane-side surface thereof. Therefore, the third lens L3 has a shape of a meniscus lens directing a convex surface thereof to the object side near the optical axis X, and has a shape of a meniscus lens directing a concave surface thereof to the object side in the periphery of the lens. With such surface shapes of the third lens L3, it is achievable to suitably restrain the incident angle of a light beam emitted from the imaging lens to the image plane IM within the range of a chief ray angle (CRA).

The imaging lens of the embodiment satisfies the following conditional expressions (1) to (8):

$$35 < (P1+P2)/|P3| < 55 \quad (1)$$

$$-8 < R2r/R3f < -3 \quad (2)$$

$$0.5 < D12/D23 < 1.0 \quad (3)$$

$$-0.1 < f1/f3 < -0.01 \quad (4)$$

$$-0.35 < f2/f3 < -0.05 \quad (5)$$

$$45 < vd1 < 75 \quad (6)$$

$$45 < vd2 < 75 \quad (7)$$

$$45 < vd3 < 75 \quad (8)$$

In the above conditional expressions:
P1: Refractive power of a first lens L1
P2: Refractive power of a second lens L2
P3: Refractive power of a third lens L3
f: Focal length of the whole lens system
f1: Focal length of a first lens L1
f2: Focal length of a second lens L2
f3: Focal length of a third lens L3
R2r: Curvature radius of an image plane-side surface of the second lens L2
R3f: Curvature radius of an object-side surface of the third lens L3
D12: Distance on the optical axis from an image plane-side surface of the first lens L1 to an object side surface of the second lens L2
D23: Distance on the optical axis from an image plane-side surface of the second lens L2 to an object-side surface of the third lens L3
vd1: Abbe's number of the first lens L1
vd2: Abbe's number of the second lens L2
vd3: Abbe's number of the third lens L3

Here, it is not necessary to satisfy all of the above conditional expressions, and it is achievable to obtain an effect corresponding to the respective conditional expression when any single one of the conditional expressions is individually satisfied.

In the embodiment, all lens surfaces are formed as an aspheric surface. When the aspheric surfaces applied to the lens surfaces have an axis Z in a direction of the optical axis X, a height H in a direction perpendicular to the optical axis X, a conical coefficient k, and aspheric coefficients $A_4$, $A_6$, $A_8$, $A_{10}$, $A_{12}$, $A_{14}$, and $A_{16}$, a shape of the aspheric surfaces of the lens surfaces is expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{[Formula 1]}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, r represents a curvature radius, d represents a distance between lens surfaces (surface spacing) on the optical axis, nd represents a refractive index, and vd represents an Abbe's number, respectively. Here, aspheric surfaces are indicated with surface numbers i affixed with * (asterisk). The sum of surface spacing on the optical axis from an object-side surface of the first lens L1 to the image plane IM (a length in air for the filter 10) is indicated as La.

Numerical Data Example 1
Basic data are shown below.

f = 2.36 mm, Fno = 2.5, ω = 44.1°
Unit: mm

Surface Data

| Surface Number i | r | d | nd | vd |
|---|---|---|---|---|
| (Object) | ∞ | ∞ | | |
| 1* (Stop) | 1.061 | 0.411 | 1.5346 | 56.1 |
| 2* | 2.805 | 0.207 (=D12) | | |
| 3* | −20.713 | 0.235 | 1.5346 | 56.1 |
| 4* | −8.296 (=R2r) | 0.369 (=D23) | | |
| 5* | 2.028 (=R3f) | 0.819 | 1.5346 | 56.1 |
| 6* | 1.697 | 0.100 | | |
| 7 | ∞ | 0.150 | 1.5168 | 64.2 |
| 8 | ∞ | 0.569 | | |
| (Image plane) | ∞ | | | | f1 = 2.95 mm
f2 = 25.71 mm
f3 = −140.28 mm
La = 2.81 mm

Aspheric Surface Data

First Surface k = 0.000, $A_4$ = −1.203E−01, $A_6$ = 1.076, $A_8$ = −3.660,
$A_{10}$ = −2.154E+01, $A_{12}$ = 8.856E+01, $A_{14}$ = 2.153E+02,
$A_{16}$ = −9.584E+02

Second Surface k = 0.000, $A_4$ = −1.283E−01, $A_6$ = −1.004, $A_8$ = 5.314,
$A_{10}$ = −2.064E+01, $A_{12}$ = −1.377E+01, $A_{14}$ = 1.811E+02,
$A_{16}$ = −2.983E+02

Third Surface k = 0.000, $A_4$ = −8.391E−01, $A_6$ = 2.869, $A_8$ = −1.517E+01,
$A_{10}$ = 4.288E+01, $A_{12}$ = −2.870E+01, $A_{14}$ = −4.285E+01,
$A_{16}$ = −2.568E+01

-continued f = 2.36 mm, Fno = 2.5, ω = 44.1°
Unit: mm

Fourth Surface k = 0.000, $A_4$ = −8.826E−01, $A_6$ = 2.640, $A_8$ = −6.575,
$A_{10}$ = 1.181E+01, $A_{12}$ = 3.318E−01, $A_{14}$ = 8.196,
$A_{16}$ = −3.030E+01
Fifth Surface k = 0.000, $A_4$ = −6.562E−01, $A_6$ = 3.162E−01,
$A_8$ = −1.967E−01, $A_{10}$ = −1.377E−01, $A_{12}$ = 3.307E−01,
$A_{14}$ = 2.126E−03, $A_{16}$ = −8.356E−02
Sixth Surface k = 0.000, $A_4$ = −2.751E−01, $A_6$ = 5.633E−02,
$A_8$ = 1.209E−02, $A_{10}$ = −1.403E−02, $A_{12}$ = −4.773E−03,
$A_{14}$ = 5.395E−03, $A_{16}$ = −1.123E−03

The values of the respective conditional expressions are as follows:

$(P1+P2)/|P3|$=53.02

$D12/D23$=0.56

$R2r/R3f$=−4.09

$f1/f3$=−0.02

$f2/f3$=−0.18

Accordingly, the imaging lens of Numerical Data Example 1 satisfies the above-described conditional expressions. In addition, the ratio (La/f) of the sum of surface spacing La to the focal length f is 1.19, and downsizing of the imaging lens is suitably achieved. Here, each lens that composes the imaging lens of Numerical Data Example 1 is made of the same material, and thereby it is achievable to reduce the manufacturing cost of the imaging lens.

Figure 2:
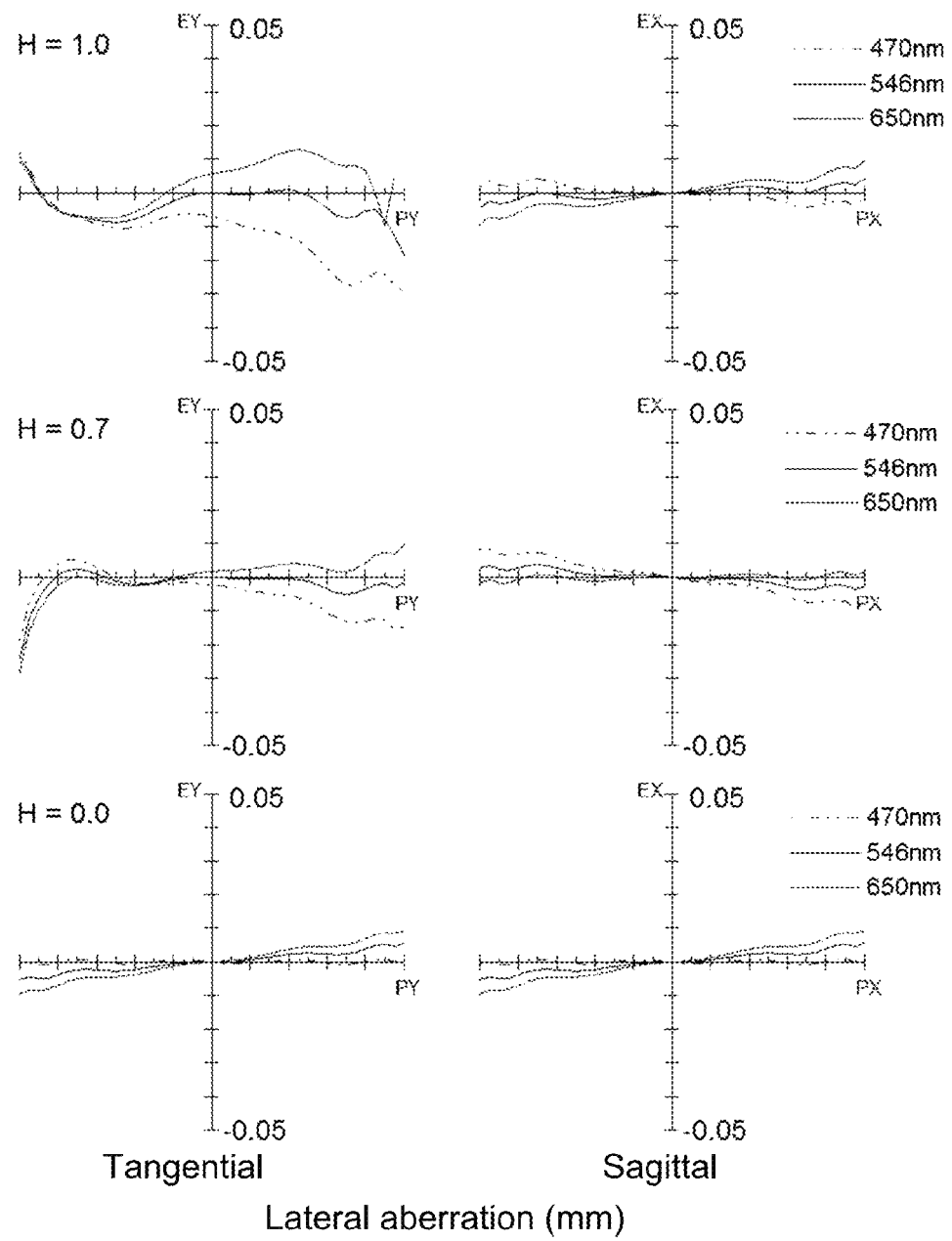
FIG. 2 is an aberration diagram showing a lateral aberration of the imaging lens of FIG. 1.
Figure 3:
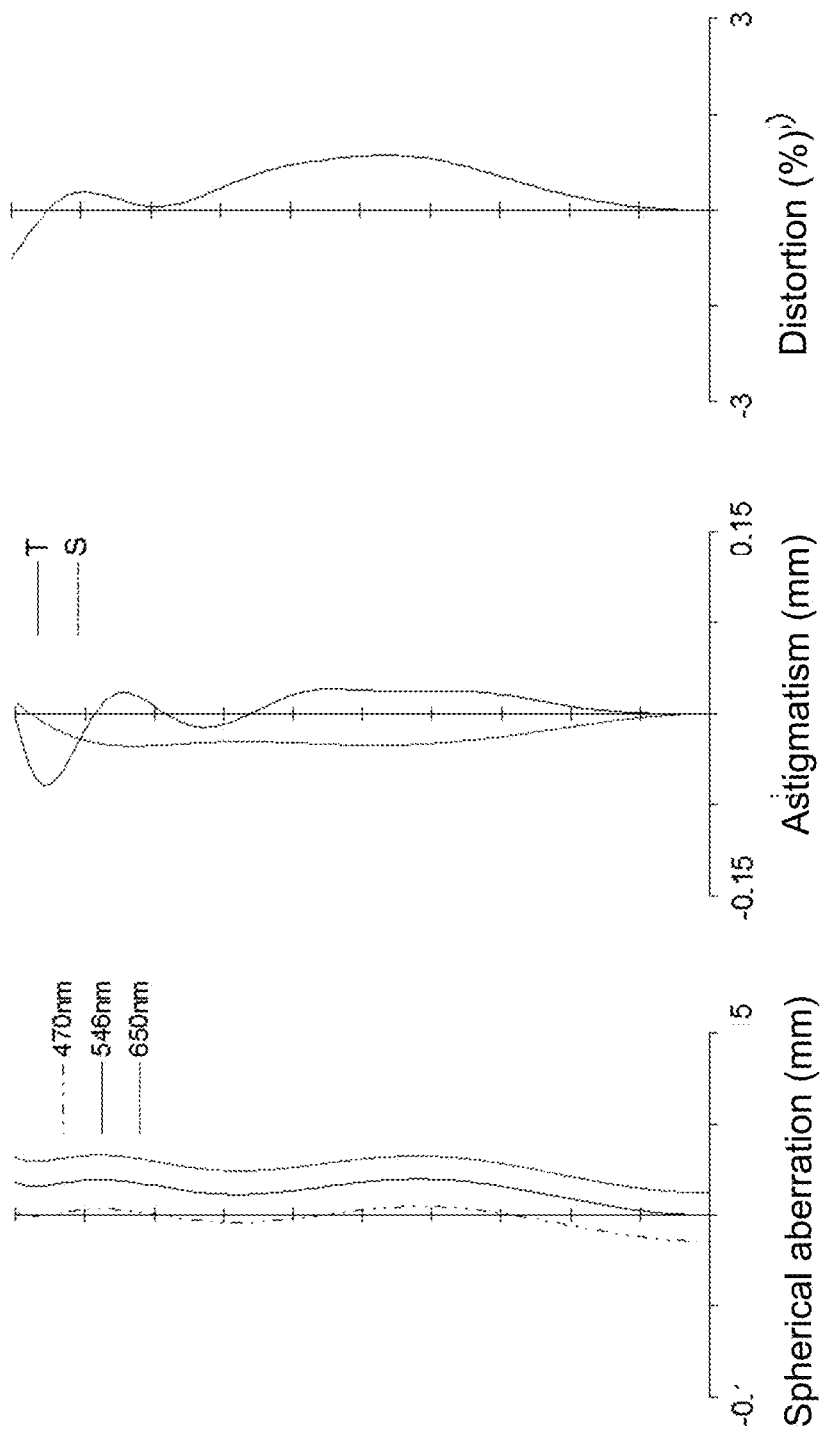
FIG. 3 is an aberration diagram showing a spherical aberration, an astigmatism, and a distortion of the imaging lens of FIG. 1.
Figure 4:
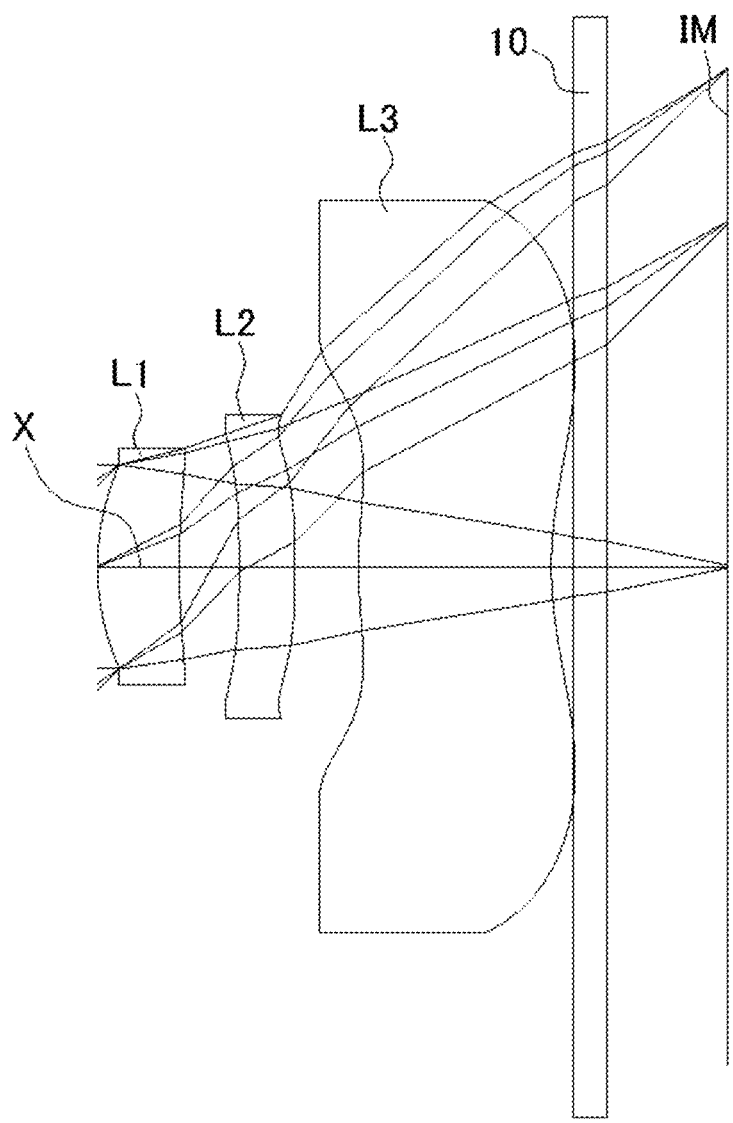
FIG. 4 shows a sectional view of a schematic configuration of an imaging lens in Numerical Data Example 2 according to the embodiment of the invention.

FIG. 2 shows a lateral aberration that corresponds to a ratio H of each image height to the maximum image height (hereinafter referred to as "image height ratio H"), which is divided into a tangential direction and a sagittal direction (which is the same in FIGS. 5, 8, 11, and 14). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (which are the same in FIGS. 6, 9, 12, and 15). As shown in FIGS. 2 and 3, according to the imaging lens of Numerical Data Example 1, the aberrations are satisfactorily corrected.

Numerical Data Example 2
Basic data are shown below.

f = 2.33 mm, Fno = 2.5, ω = 44.5°
Unit: mm

Surface Data

| Surface Number i | r | d | nd | vd |
|---|---|---|---|---|
| (Object) | ∞ | ∞ | | |
| 1* (Stop) | 1.099 | 0.371 | 1.5346 | 56.1 |
| 2* | 3.392 | 0.271 (=D12) | | |
| 3* | −17.237 | 0.254 | 1.5346 | 56.1 |
| 4* | −8.425 (=R2r) | 0.289 (=D23) | | |
| 5* | 2.075 (=R3f) | 0.875 | 1.5346 | 56.1 |
| 6* | 1.706 | 0.100 | | |
| 7 | ∞ | 0.150 | 1.5168 | 64.2 |
| 8 | ∞ | 0.550 | | |
| (Image plane) | ∞ | | | | f1 = 2.88 mm
f2 = 30.52 mm
f3 = −103.19 mm
La = 2.81 mm

Aspheric Surface Data

First Surface k = 0.000, $A_4$ = −1.162E−01, $A_6$ = 1.033, $A_8$ = −3.525,
$A_{10}$ = −2.047E+01, $A_{12}$ = 8.529E+01, $A_{14}$ = 2.024E+02,
$A_{16}$ = −9.032E+02
Second Surface k = 0.000, $A_4$ = −8.692E−02, $A_6$ = −8.742E−01,
$A_8$ = 5.701, $A_{10}$ = −1.940E+01, $A_{12}$ = −1.355E+01,
$A_{14}$ = 1.751E+02, $A_{16}$ = −2.751E+02
Third Surface k = 0.000, $A_4$ = −8.135E−01, $A_6$ = 3.079, $A_8$ = −1.528E+01,
$A_{10}$ = 4.265E+01, $A_{12}$ = −2.764E+01, $A_{14}$ = −3.542E+01,
$A_{16}$ = −2.469
Fourth Surface k = 0.000, $A_4$ = −9.811E−01, $A_6$ = 2.564, $A_8$ = −6.637,
$A_{10}$ = 1.153E+01, $A_{12}$ = −2.754E−01, $A_{14}$ = 7.934,
$A_{16}$ = −2.627E+01
Fifth Surface k = 0.000, $A_4$ = −7.403E−01, $A_6$ = 2.555E−01,
$A_8$ = −9.664E−02, $A_{10}$ = −5.662E−02, $A_{12}$ = 3.460E−01,
$A_{14}$ = −1.915E−02, $A_{16}$ = −1.174E−01
Sixth Surface k = 0.000, $A_4$ = −2.617E−01, $A_6$ = 3.157E−02,
$A_8$ = 2.848E−02, $A_{10}$ = −1.494E−02, $A_{12}$ = −5.825E−03,
$A_{14}$ = 5.284E−03, $A_{16}$ = −1.014E−03

The values of the respective conditional expressions are as follows:

$(P1+P2)/|P3|$=39.22

$D12/D23$=0.94

$R2r/R3f$=−4.06

$f1/f3$=−0.03

$f2/f3$=−0.30

Accordingly, the imaging lens of Numerical Data Example 2 satisfies the above-described conditional expressions. In addition, the ratio (La/f) of the sum of surface spacing La to the focal length f is 1.21, and downsizing of the imaging lens is suitably achieved. Here, the respective lenses that compose the imaging lens of Numerical Data Example 2 are also made of the same material, and the manufacturing cost of the imaging lens is suitably restrained.

Figure 5:
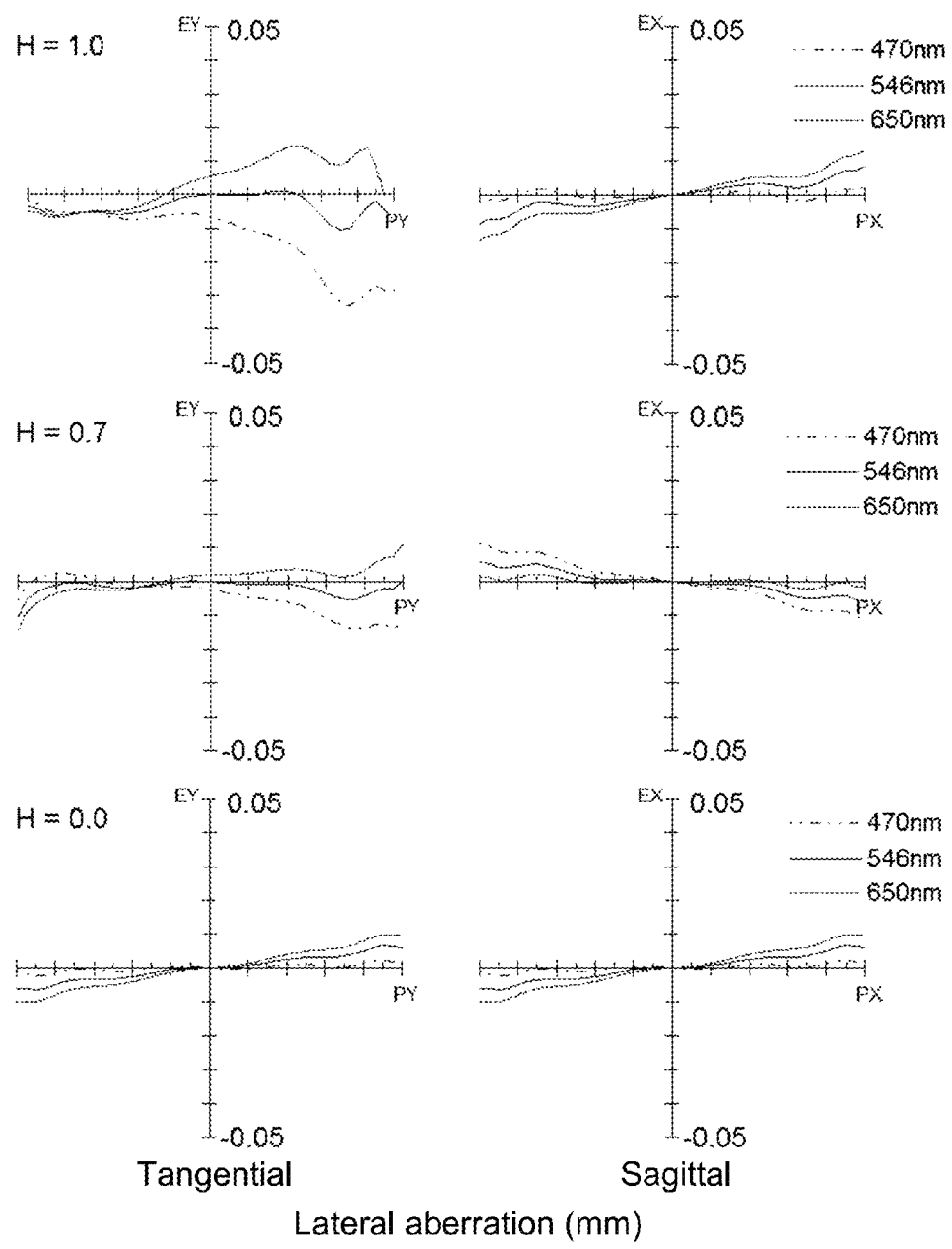
FIG. 5 is an aberration diagram showing a lateral aberration of the imaging lens of FIG. 4.
Figure 6:
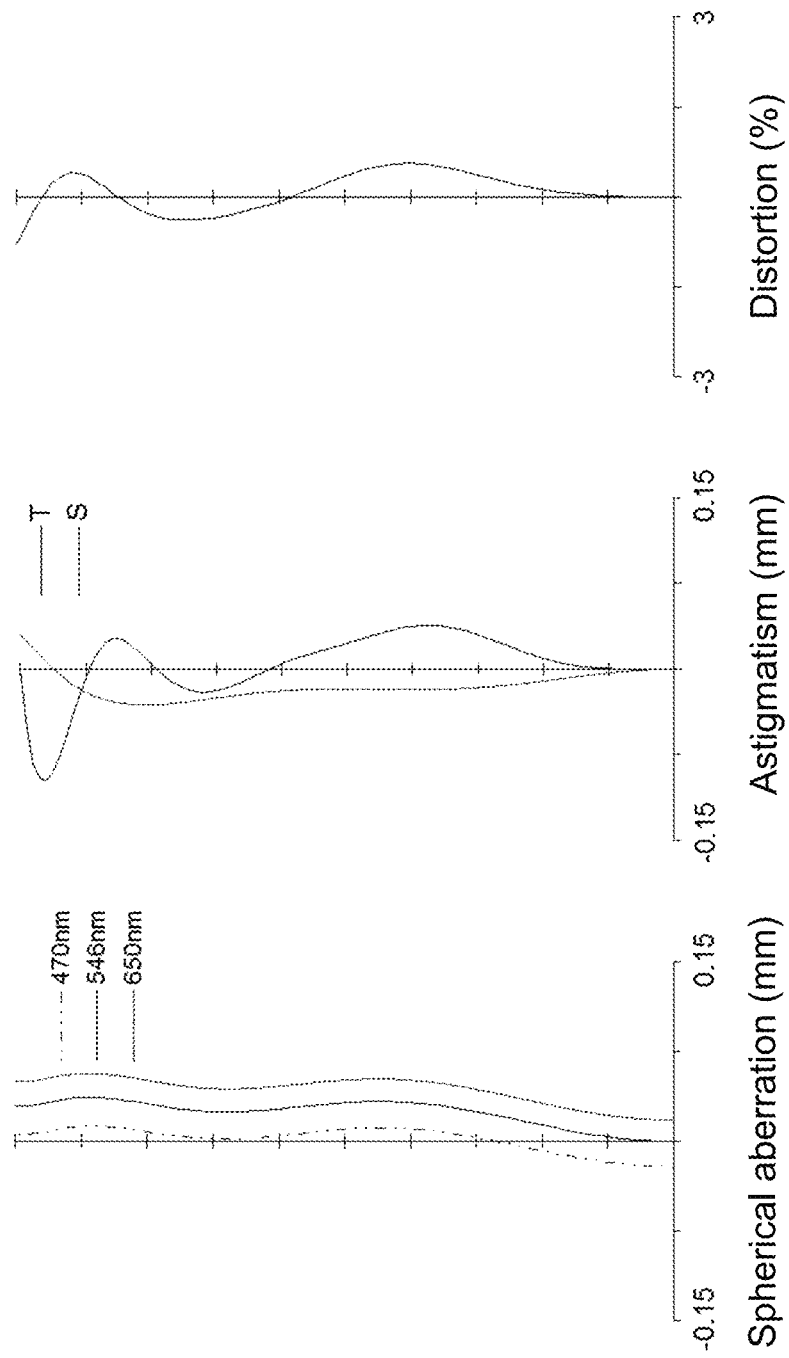
FIG. 6 is an aberration diagram showing a spherical aberration, an astigmatism, and a distortion of the imaging lens of FIG. 4.
Figure 7:
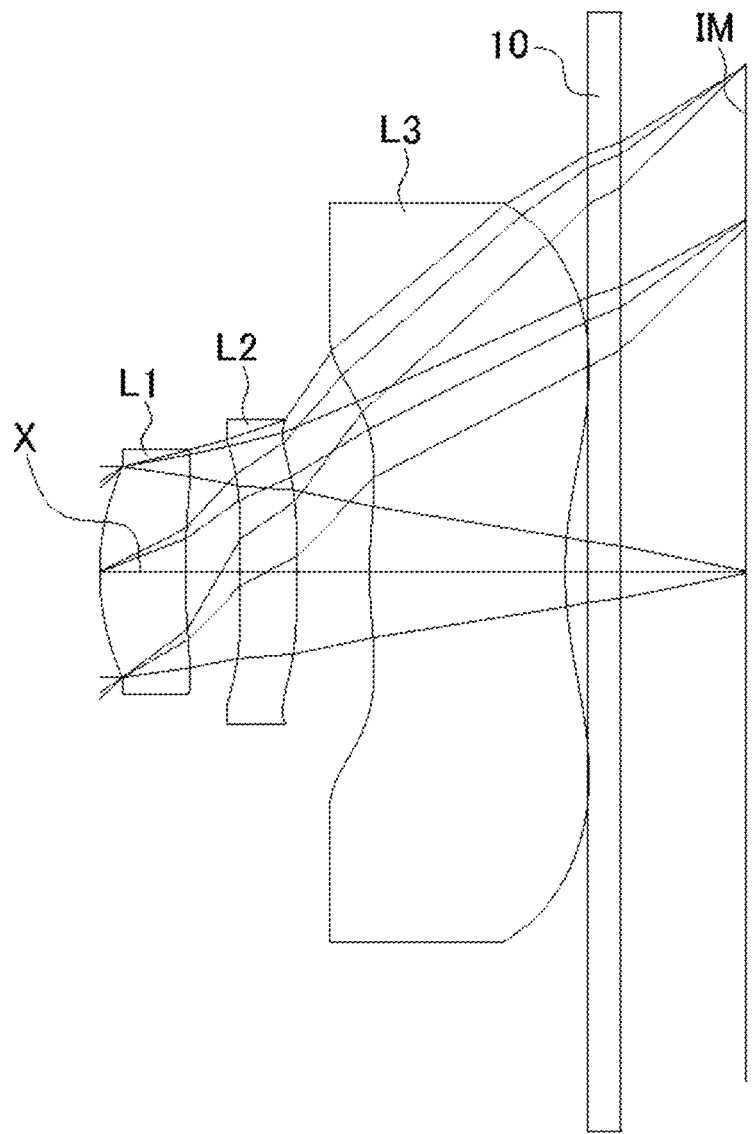
FIG. 7 shows a sectional view of a schematic configuration of an imaging lens in Numerical Data Example 3 according to the embodiment of the invention.

FIG. 5 shows the lateral aberration that corresponds to the image height ratio H of the imaging lens, and FIG. 6 shows a spherical aberration (mm), astigmatism (mm), and a distortion (%), respectively. As shown in FIGS. 5 and 6, according to the imaging lens of Numerical Data Example 2, the aberrations are also satisfactorily corrected.

Numerical Data Example 3

Basic data are shown below.

| f = 2.35 mm, Fno = 2.5, ω = 44.3° Unit: mm | | | | |
|---|---|---|---|---|
| Surface Data | | | | |
| Surface Number i | r | d | nd | vd |
| (Object) | ∞ | ∞ | | |
| 1* (Stop) | 1.092 | 0.382 | 1.5346 | 56.1 |
| 2* | 3.118 | 0.247 (=D12) | | |
| 3* | 5823.910 | 0.252 | 1.5346 | 56.1 |
| 4* | −16.197 (=R2r) | 0.323 (=D23) | | |
| 5* | 2.062 (=R3f) | 0.873 | 1.5346 | 56.1 |
| 6* | 1.694 | 0.100 | | |
| 7 | ∞ | 0.150 | 1.5168 | 64.2 |
| 8 | ∞ | 0.556 | | |
| (Image plane) | ∞ | | | | f1 = 2.95 mm
f2 = 30.21 mm
f3 = −102.64 mm
La = 2.83 mm

Aspheric Surface Data

First Surface $k = 0.000, A_4 = -1.267E-01, A_6 = 9.817E-01, A_8 = -3.690,$
$A_{10} = -1.996E+01, A_{12} = 8.883E+01, A_{14} = 1.953E+02,$
$A_{16} = -9.490E+02$ Second Surface $k = 0.000, A_4 = -1.357E-01, A_6 = -9.728E-01, A_8 = 5.602,$
$A_{10} = -1.974E+01, A_{12} = -1.579E+01, A_{14} = 1.697E+02,$
$A_{16} = -2.602E+02$ Third Surface $k = 0.000, A_4 = -8.715E-01, A_6 = 3.035, A_8 = -1.539E+01,$
$A_{10} = 4.259E+01, A_{12} = -2.852E+01, A_{14} = -3.917E+01,$
$A_{16} = -5.958$ Fourth Surface $k = 0.000, A_4 = -1.009, A_6 = 2.624, A_8 = -6.566,$
$A_{10} = 1.142E+01, A_{12} = -6.369E-01, A_{14} = 7.688,$
$A_{16} = -2.482E+01$ Fifth Surface $k = 0.000, A_4 = -7.300E-01, A_6 = 2.460E-01,$
$A_8 = -1.050E-01, A_{10} = -5.785E-02, A_{12} = 3.483E-01,$
$A_{14} = -1.657E-02, A_{16} = -1.159E-01$ Sixth Surface $k = 0.000, A_4 = -2.672E-01, A_6 = 3.149E-02,$
$A_8 = 2.900E-02, A_{10} = -1.493E-02, A_{12} = -5.863E-03,$
$A_{14} = 5.272E-03, A_{16} = -1.013E-03$ The values of the respective conditional expressions are as follows:

$(P1+P2)/|P3|=38.21$ $D12/D23=0.76$ $R2r/R3f=-7.86$ $f1/f3=-0.03$ $f2/f3=-0.29$

Accordingly, the imaging lens of Numerical Data Example 3 satisfies the above-described conditional expressions. In addition, the ratio (La/f) of the sum of surface spacing La to the focal length f is 1.20, and downsizing of the imaging lens is suitably achieved. Here, the respective lenses that compose the imaging lens of Numerical Data Example 3 are also made of the same material, and the manufacturing cost of the imaging lens is suitably restrained.

Figure 8:
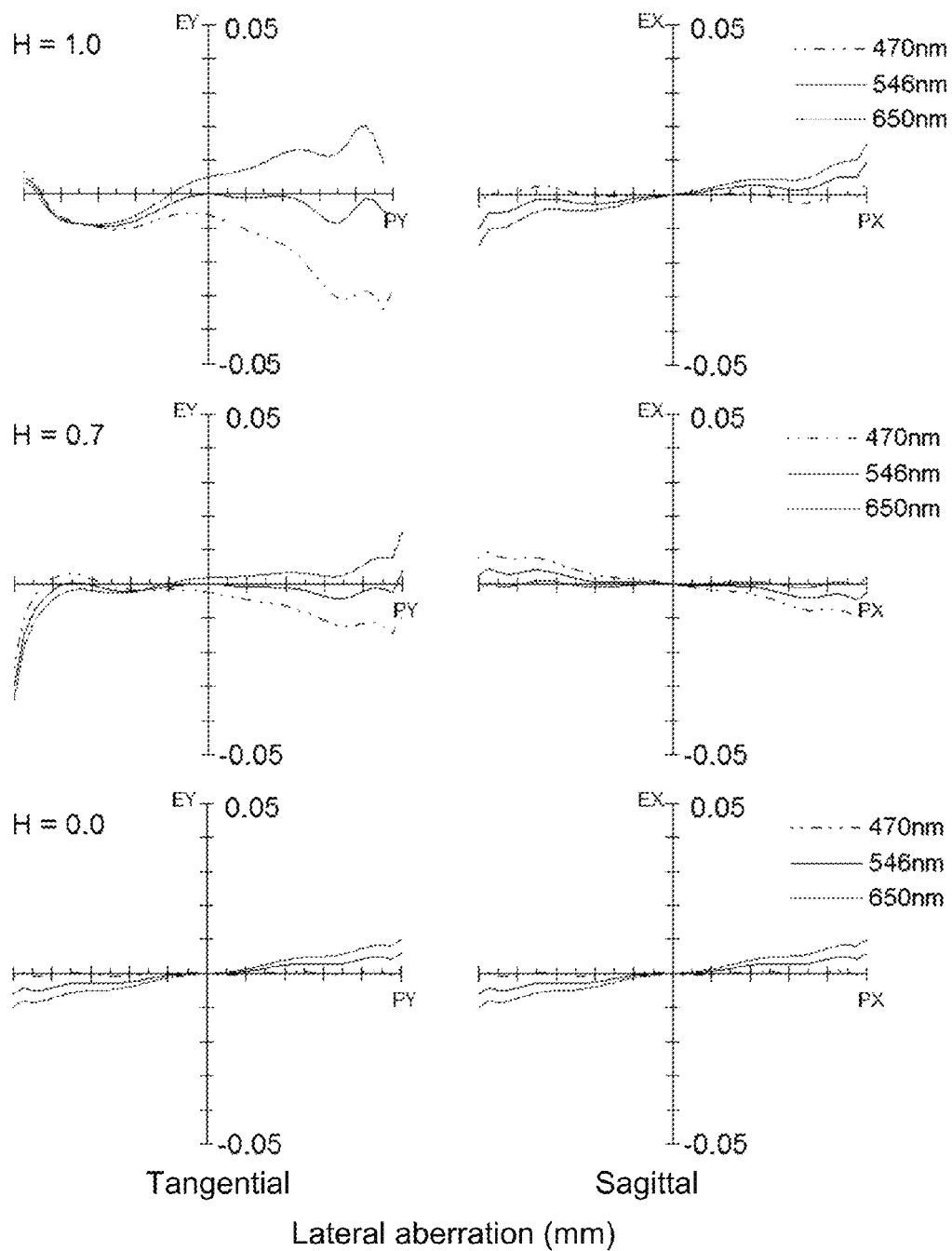
FIG. 8 is an aberration diagram showing a lateral aberration of the imaging lens of FIG. 7.
Figure 9:
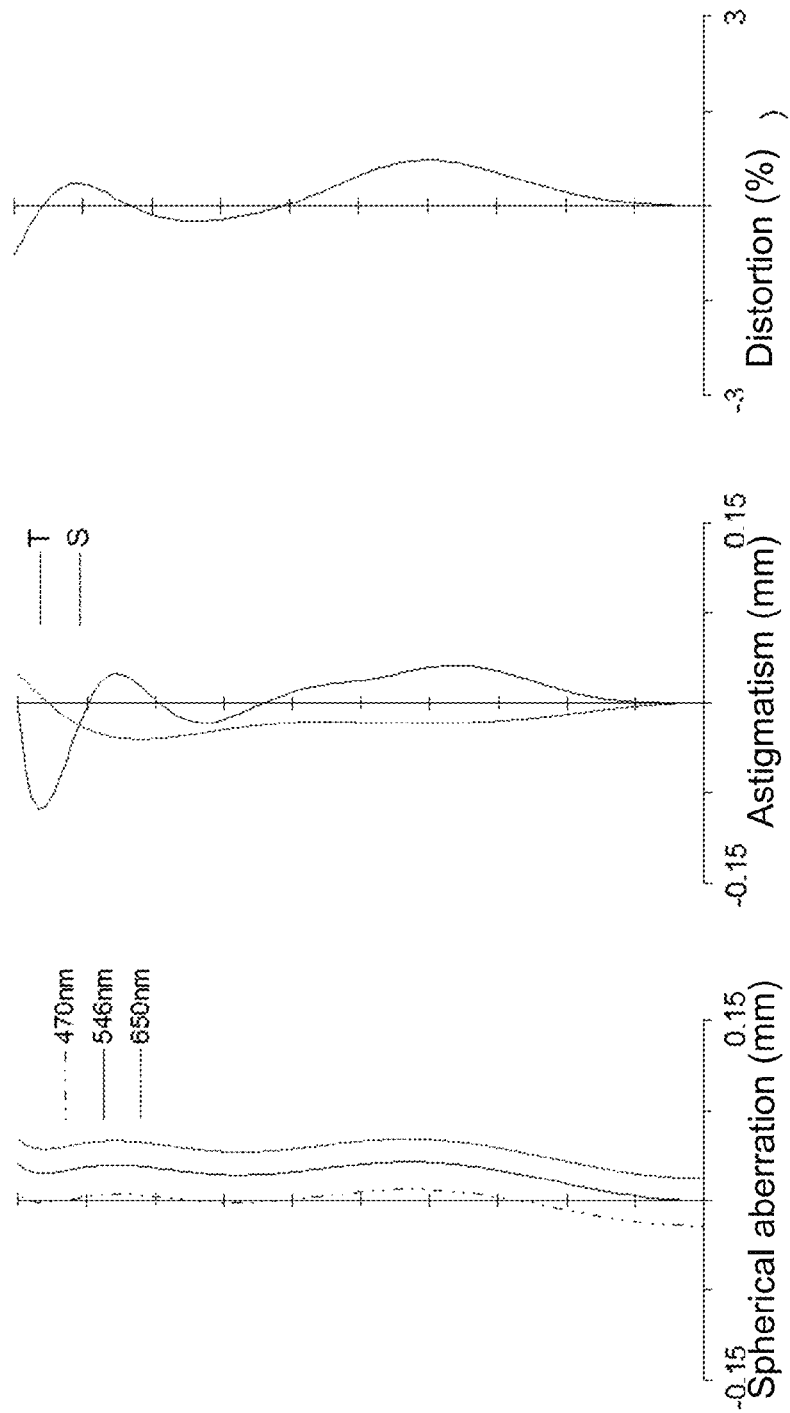
FIG. 9 is an aberration diagram showing a spherical aberration, an astigmatism, and a distortion of the imaging lens of FIG. 7.
Figure 10:
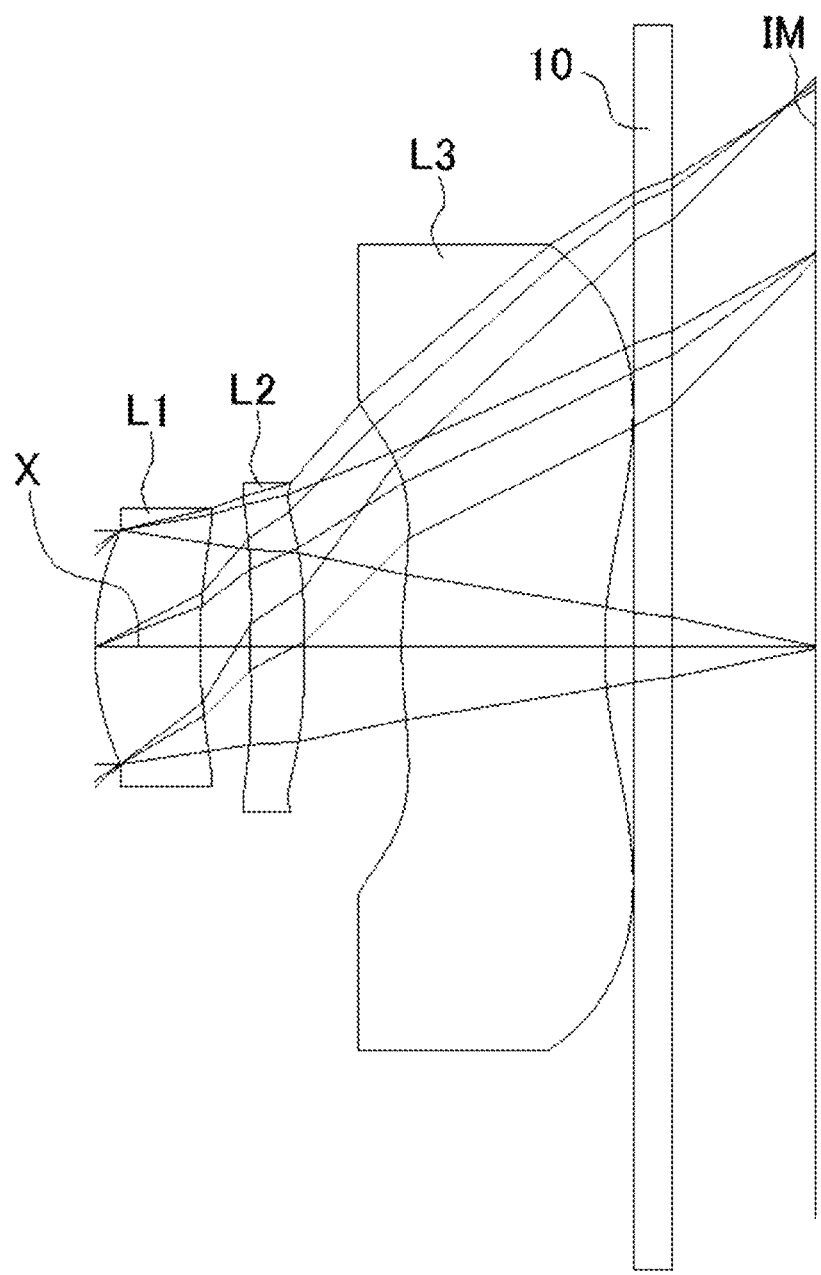
FIG. 10 shows a sectional view of a schematic configuration of an imaging lens in Numerical Data Example 4 according to the embodiment of the invention.

FIG. 8 shows the lateral aberration that corresponds to the image height ratio H of the imaging lens, and FIG. 9 shows a spherical aberration (mm), astigmatism (mm), and a distortion (%), respectively. As shown in FIGS. 8 and 9, according to the imaging lens of Numerical Data Example 3, the aberrations are also satisfactorily corrected.

Numerical Data Example 4

Basic data are shown below.

| f = 2.36 mm, Fno = 2.5, ω = 44.1° Unit: mm | | | | |
|---|---|---|---|---|
| Surface Data | | | | |
| Surface Number i | r | d | nd | vd |
| (Object) | ∞ | ∞ | | |
| 1* (Stop) | 1.103 | 0.421 | 1.5346 | 56.1 |
| 2* | 2.288 | 0.203 (=D12) | | |
| 3* | 12.148 | 0.214 | 1.5346 | 56.1 |
| 4* | −8.263 (=R2r) | 0.392 (=D23) | | |
| 5* | 2.016 (=R3f) | 0.813 | 1.5346 | 56.1 |
| 6* | 1.676 | 0.120 | | |
| 7 | ∞ | 0.150 | 1.5168 | 64.2 |
| 8 | ∞ | 0.575 | | |
| (Image plane) | ∞ | | | | f1 = 3.55 mm
f2 = 9.23 mm
f3 = −111.52 mm
La = 2.84 mm

Aspheric Surface Data

First Surface $k = 0.000, A_4 = -9.992E-02, A_6 = 9.329E-01, A_8 = -3.450,$
$A_{10} = -1.902E+01, A_{12} = 8.701E+01, A_{14} = 2.025E+02,$
$A_{16} = -9.578E+02$ Second Surface $k = 0.000, A_4 = -6.031E-02, A_6 = -7.697E-01, A_8 = 5.660,$
$A_{10} = -2.021E+01, A_{12} = -1.380E+01, A_{14} = 1.796E+02,$
$A_{16} = -2.707E+02$ Third Surface $k = 0.000, A_4 = -8.040E-01, A_6 = 3.230, A_8 = -1.525E+01,$
$A_{10} = 4.186E+01, A_{12} = -2.982E+01, A_{14} = -3.583E+01,$
$A_{16} = 1.991E+01$ Fourth Surface $k = 0.000, A_4 = -8.988E-01, A_6 = 2.515, A_8 = -6.756,$
$A_{10} = 1.153E + 01, A_{12} = 9.100E-01, A_{14} = 9.309,$
$A_{16} = -2.823E+01$ Fifth Surface $k = 0.000, A_4 = -6.456E-01, A_6 = 3.312E-01,$
$A_8 = -2.788E-01, A_{10} = -1.626E-01, A_{12} = 3.563E-01,$
$A_{14} = 3.461E-02, A_{16} = -7.458E-02$ Sixth Surface $k = 0.000, A_4 = -2.693E-01, A_6 = 5.211E-02,$
$A_8 = 1.488E-02, A_{10} = -1.423E-02, A_{12} = -5.019E-03,$
$A_{14} = 5.366E-03, A_{16} = -1.090E-03$ The values of the respective conditional expressions are as follows:

$(P1+P2)/|P3|=43.52$ $D12/D23=0.52$ $R2r/R3f=-4.10$ $f1/f3=-0.03$ $f2/f3=-0.08$

Accordingly, the imaging lens of Numerical Data Example 4 satisfies the above-described conditional expressions. In addition, the ratio (La/f) of the sum of surface spacing La to the focal length f is 1.20, and downsizing of the imaging lens is suitably achieved. Here, the respective lenses that compose the imaging lens of Numerical Data Example 4 are also made of the same material, and the manufacturing cost of the imaging lens is suitably restrained.

Figure 11:
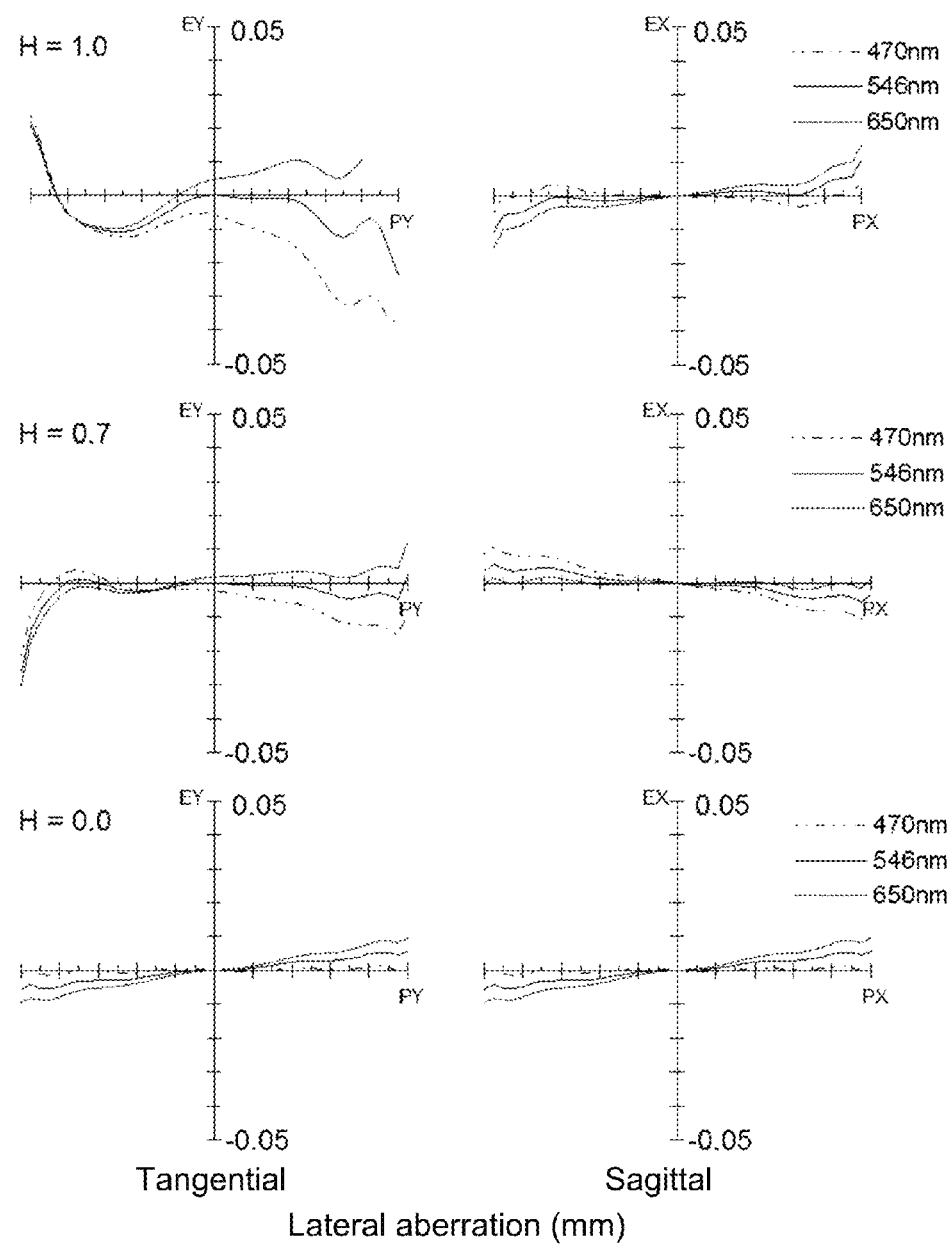
FIG. 11 is an aberration diagram showing a lateral aberration of the imaging lens of FIG. 10.
Figure 12:
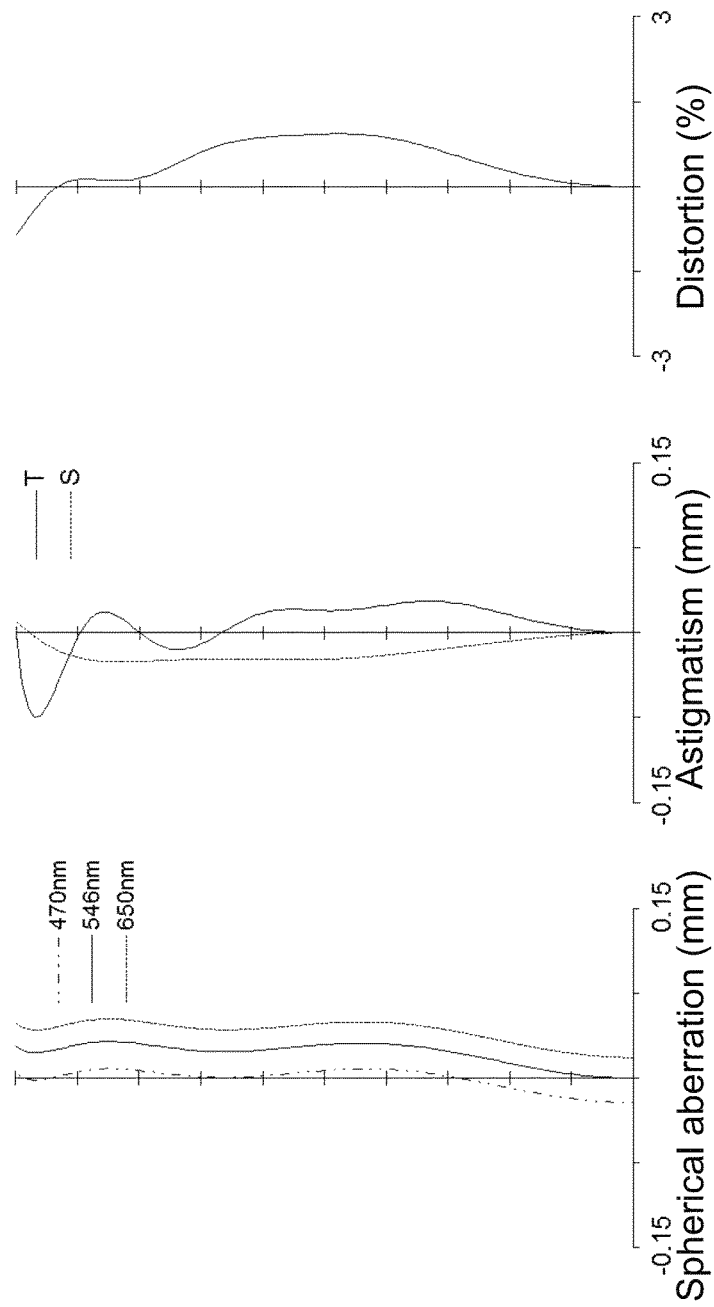
FIG. 12 is an aberration diagram showing a spherical aberration, an astigmatism, and a distortion of the imaging lens of FIG. 10.
Figure 13:
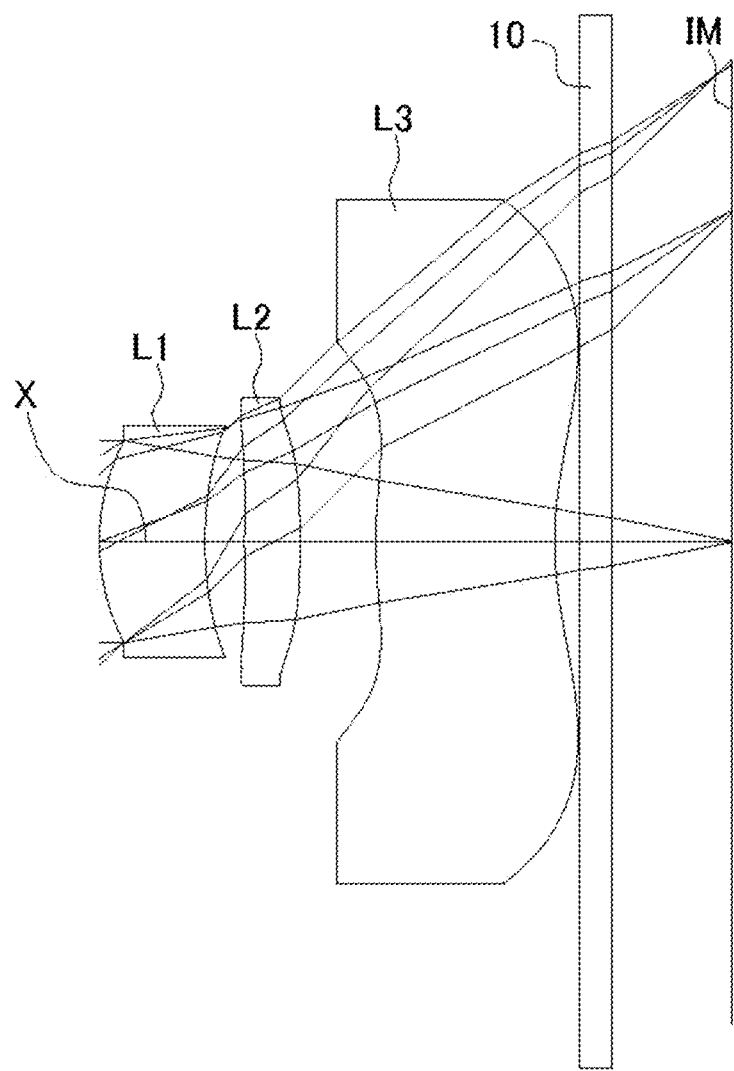
FIG. 13 shows a sectional view of a schematic configuration of an imaging lens in Numerical Data Example 5 according to the embodiment of the invention.

FIG. 11 shows the lateral aberration that corresponds to the image height ratio H of the imaging lens, and FIG. 12 shows a spherical aberration (mm), astigmatism (mm), and a distortion (%), respectively. As shown in FIGS. 11 and 12, according to the imaging lens of Numerical Data Example 4, the aberrations are also satisfactorily corrected.

Numerical Data Example 5

Basic data are shown below.

f = 2.46 mm, Fno = 2.5, ω = 43.0°
Unit: mm

Surface Data

| Surface Number i | r | d | nd | vd |
|---|---|---|---|---|
| (Object) | ∞ | ∞ | | |
| 1* (Stop) | 1.052 | 0.500 | 1.5346 | 56.1 |
| 2* | 1.831 | 0.187 (=D12) | | |
| 3* | 10.417 | 0.263 | 1.5346 | 56.1 |
| 4* | −8.434 (=R2r) | 0.359 (=D23) | | |
| 5* | 2.051 (=R3f) | 0.848 | 1.5346 | 56.1 |
| 6* | 1.687 | 0.120 | | |
| 7 | ∞ | 0.150 | 1.5168 | 64.2 |
| 8 | ∞ | 0.571 | | |
| (Image plane) | ∞ | | | | f1 = 3.78 mm
f2 = 8.76 mm
f3 = −94.10 mm
La = 2.95 mm

Aspheric Surface Data

First Surface k = 0.000, $A_4$ = 2.620E−02, $A_6$ = −3.773E−01, $A_8$ = 3.307,
$A_{10}$ = −6.735, $A_{12}$ = −9.198E+01, $A_{14}$ = 5.829E+02,
$A_{16}$ = −9.753E+02

Second Surface k = 0.000, $A_4$ = 2.680E−02, $A_6$ = 4.702E−01,
$A_8$ = −6.250E−01, $A_{10}$ = 4.058E−01, $A_{12}$ = −2.902,
$A_{14}$ = 1.633E+01, $A_{16}$ = −1.344E+01

Third Surface k = 0.000, $A_4$ = −7.955E−01, $A_6$ = 3.973, $A_8$ = −1.735E+01,
$A_{10}$ = 4.145E+01, $A_{12}$ = −2.692E+01, $A_{14}$ = −3.107E+01,
$A_{16}$ = 3.953E+01

-continued f = 2.46 mm, Fno = 2.5, ω = 43.0°
Unit: mm

Fourth Surface k = 0.000, $A_4$ = −9.554E−01, $A_6$ = 2.359, $A_8$ = −5.559,
$A_{10}$ = 7.551, $A_{12}$ = −2.880, $A_{14}$ = 7.889, $A_{16}$ = −4.910

Fifth Surface k = 0.000, $A_4$ = −6.806E−01, $A_6$ = 3.604E−01,
$A_8$ = −3.493E−01, $A_{10}$ = −1.065E−01, $A_{12}$ = 1.608E−01,
$A_{14}$ = 3.380E−01, $A_{16}$ = −1.861E−01

Sixth Surface k = 0.000, $A_4$ = −2.736E−01, $A_6$ = 5.938E−02,
$A_8$ = 6.999E−03, $A_{10}$ = −1.372E−02, $A_{12}$ = −2.128E−03,
$A_{14}$ = 3.906E−03, $A_{16}$ = −8.554E−04

The values of the respective conditional expressions are as follows:

$(P1+P2)/|P3|=35.66$ $D12/D23=0.52$ $R2r/R3f=-4.11$ $f1/f3=-0.04$ $f2/f3=-0.09$

Accordingly, the imaging lens of Numerical Data Example 5 satisfies the above-described conditional expressions. In addition, the ratio (La/f) of the sum of surface spacing La to the focal length f is 1.20, and downsizing of the imaging lens is suitably achieved. Here, the respective lenses that compose the imaging lens of Numerical Data Example 5 are also made of the same material, and the manufacturing cost of the imaging lens is suitably restrained.

Figure 14:
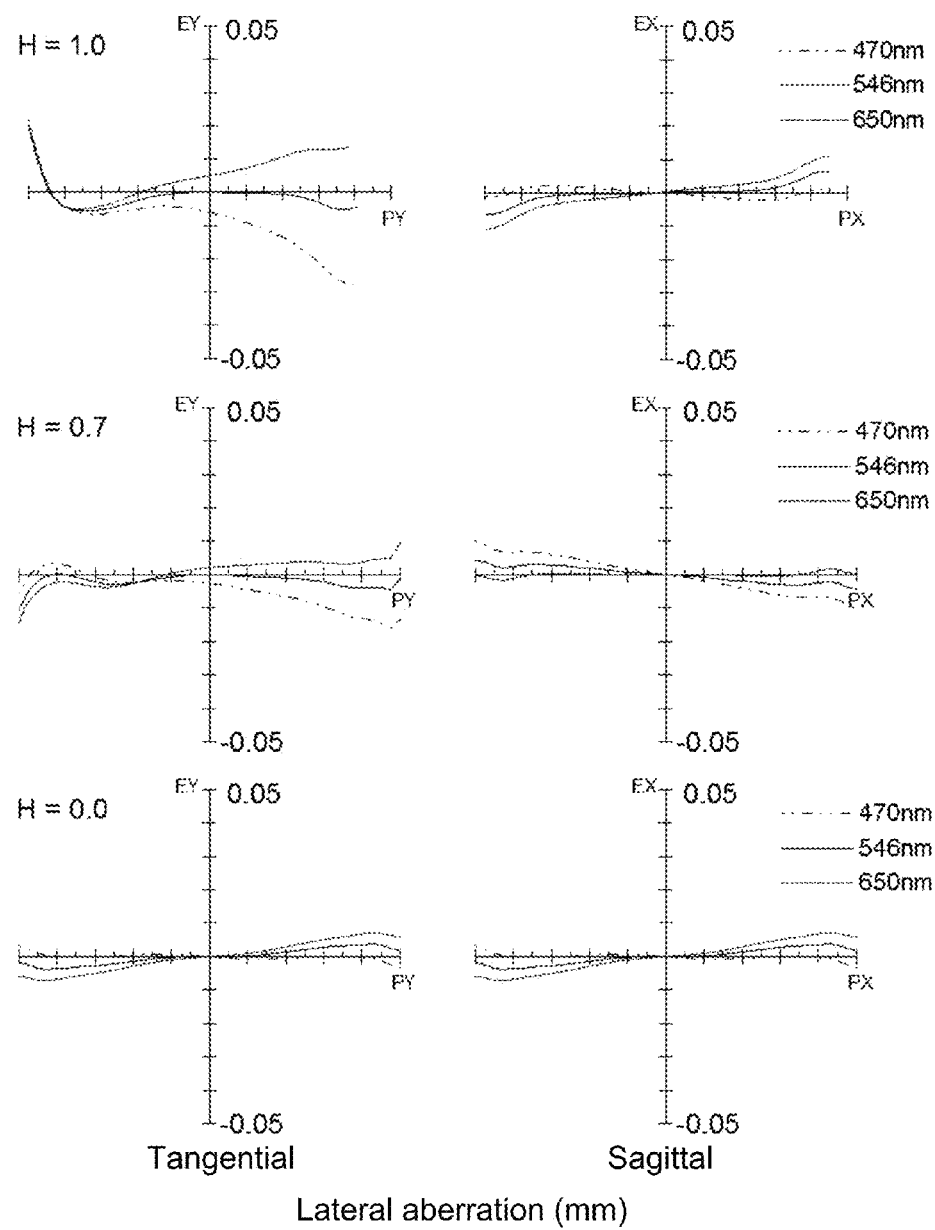
FIG. 14 is an aberration diagram showing a lateral aberration of the imaging lens of FIG. 13.
Figure 15:
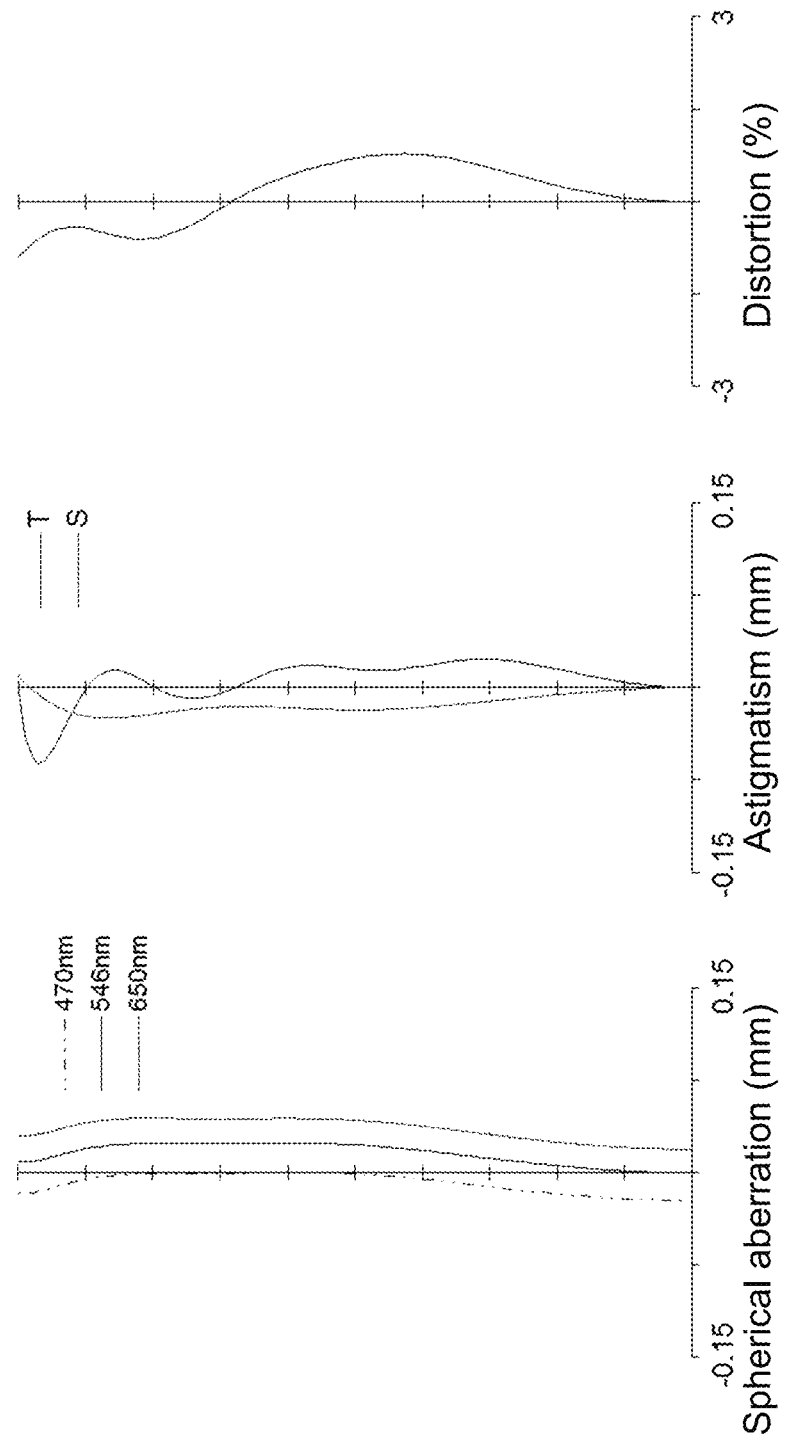
FIG. 15 is an aberration diagram showing a spherical aberration, an astigmatism, and a distortion of the imaging lens of FIG. 13.

FIG. 14 shows the lateral aberration that corresponds to the image height ratio H of the imaging lens, and FIG. 15 shows a spherical aberration (mm), astigmatism (mm), and a distortion (%), respectively. As shown in FIGS. 14 and 15, according to the imaging lens of Numerical Data Example 5, the aberrations are also satisfactorily corrected.

With increasing variety of functions of cellular phones and smartphones, an imaging lens for mounting in cameras of those devices is even more required to have a wider angle than before. By mounting an imaging lens having a wide angle in a camera, it is not only achievable to take an image over wider range, but also possible to clip an image in a desired range out of an image taken in a wider range upon fabrication. Since the imaging lens of the embodiment has a relatively wide angle of view, it is achievable to fully meet those demands.

Moreover, with advancement in downsizing of cameras, a small-sized imaging element has been mounted in the aforementioned cameras. In case of the small-sized imaging element, since a light-receiving area of each pixel is generally small, there is an issue of a dark image in comparison with an image taken by a large imaging element having the same number of pixels. As one of methods for solving such problem, there is a method that improves a light receiving sensitivity of an imaging element using an electric circuit. However, when the light receiving sensitivity increases, a noise component that does not contribute directly to the image formation is also amplified, so that it is often necessary to have another electric circuit to reduce or eliminate noises. Since the imaging lens of the embodiment has a relatively small F number, it is achievable to obtain sufficiently bright image without such electric circuit or the like. Moreover, because of its small F number, it is also possible to obtain a bright image even in a relatively dark environment, so that it is possible to provide the imaging lens for use in new applications of cellular phones and smartphones.

Accordingly, when the imaging lens of the embodiment is mounted in a camera mounted in a portable device such as cellular phones, smartphones, and portable information terminals, digital still cameras, security cameras, vehicle onboard cameras, and network cameras, it is possible to attain both high functionality and downsizing of the cameras.

The present invention is applicable in an imaging lens mounted in a device that requires satisfactory aberration correcting performance as well as having a small size as an imaging lens, for example, in an imaging lens for mounting in a device such as cellular phones and digital still cameras.

The disclosure of Japanese Patent Application No. 2013-156616, filed on Jul. 29, 2013, is incorporated in the application by reference.

While the invention has been explained with reference to the specific embodiment of the invention, the explanation is illustrative and the invention is limited only by the appended claims.

What is claimed is:

1. An imaging lens comprising:
   a first lens having positive refractive power;
   a second lens having positive refractive power; and
   a third lens having negative refractive power, arranged in this order from an object side to an image plane side,
   wherein said first lens is formed in a shape so that both a surface thereof on the object side and a surface thereof on the image plane side have positive curvature radii,
   said second lens is formed in a shape so that a surface thereof on the image plane side has a negative curvature radius,
   said third lens is formed in a shape so that both a surface thereof on the object side and a surface thereof on the image plane side have positive curvature radii,
   said first lens has the refractive power P1, said second lens has the refractive power P2, said third lens has the refractive power P3, said second lens has the surface on the image plane side having the curvature radius R2r, and said third lens has the surface on the object side having the curvature radius R3f so that the following conditional expressions are satisfied, $35 < (P1+P2)/|P3| < 55$ $-8 < R2r/R3f < -3$.

2. The imaging lens according to claim 1, wherein said first lens has the surface on the image plane side situated away from a surface of the second lens on the object side by a distance D12 on an optical axis thereof, and
   said second lens has the surface on the image plane side situated away from the surface of the third lens on the object side by a distance D23 on the optical axis thereof so that the following conditional expression is satisfied, $0.5 < D12/D23 < 1.0$.

3. The imaging lens according to claim 1, wherein said first lens has a focal length f1 and said third lens has a focal length f3 so that the following conditional expression is satisfied, $-0.1 < f1/f3 < -0.01$.

4. The imaging lens according to claim 1, wherein said second lens has a focal length f2 and said third lens has a focal length f3 so that the following conditional expression is satisfied, $-0.35 < f2/f3 < -0.05$.

5. The imaging lens according to claim 1, wherein said first lens has an Abbe's number vd1, said second lens has an Abbe's number vd2, and said third lens has an Abbe's number vd3 so that the following conditional expressions are satisfied, $45 < vd1 < 75$, $45 < vd2 < 75$, $45 < vd3 < 75$.

* * * * *